3,416,276
MASONRY WALLS AND PARTITIONS AND
METHOD OF FABRICATING SAME
Arnold P. Caputo, Hamden, Morris Schupack, Stamford, and Alex D. McDonald, Glenbrook, Conn., assignors, by direct and mesne assignments, to Intercon Research, Incorporated, Indianapolis, Ind., a corporation of Connecticut
Filed Aug. 26, 1966, Ser. No. 575,383
6 Claims. (Cl. 52—293)

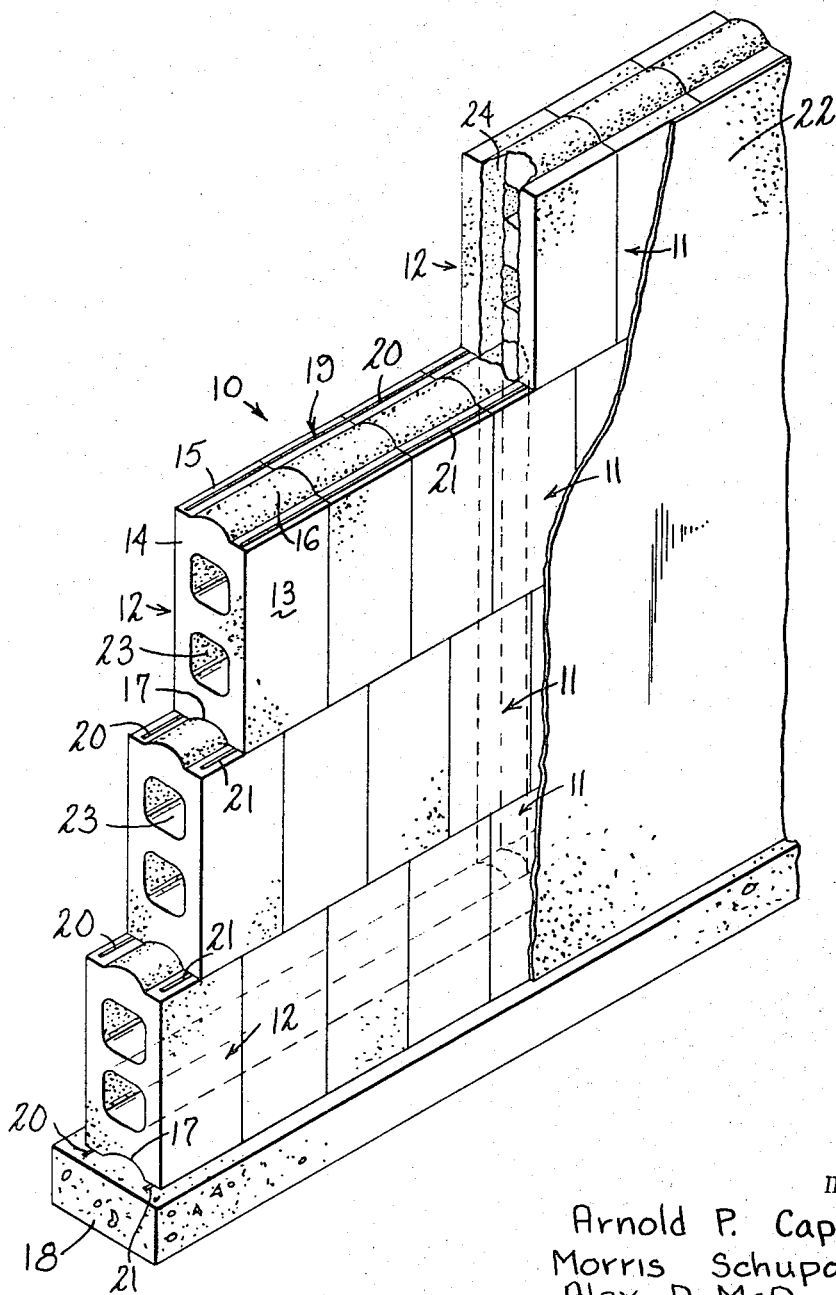

ABSTRACT OF THE DISCLOSURE

A masonry wall and method of making it which employs masonry blocks having opposed generally rectangular side, end and facing surfaces. A first course of the blocks is laid with the side surfaces thereof in non-bonded abutting relation and the longer dimension of said blocks vertically oriented. Generally parallel beads of an adhesive are applied to the upper horizontally disposed end surfaces of the first course of blocks, and a second course of said blocks is laid upon the first course of blocks with the end surfaces of said second course spanning the line of abutment with the blocks in the first course and with the side surfaces of said blocks of the second course in abutting relation with each other.

---

This invention relates to walls and partitions, and more particularly to new and improved wall and partition structures, and to a method of constructing such walls or partitions utilizing masonry block, and the like.

Preformed masonry block is a widely used element in the construction industry. In manufacturing masonry block, such as concrete and cinder block, the mold for the green aggregate is commonly supported on a pallet. When the mold is stripped from the green blocks, the blocks are supported on the pallet during curing in kilns or autoclaves. The pallets have a tendency to warp or otherwise deform when subjected to the block curing environment in kilns or autoclaves. As a result, the surface of the block resting on the pallet conforms to the contour thereof and upon curing is non-planar, having some degree of concavity or convexity. In conventional construction techniques such inaccuracies in manufactured blocks are compensated for by the mason laying the block.

Structural walls and partitions made of masonry blocks utilize cement lime mortars, and the like, to join the blocks. Such mortars cover the bed of the blocks along the length of each course, with the mortar also filling the head joints along the vertical surfaces at the ends of the block. The mortar therefore serves two purposes, it acts as a binding agent between adjacent blocks and it compensates for the inconsistencies in the pallet surfaces of the block, thus allowing the erection of an acceptable wall or partition. While the consistency and viscosity of the usual cement lime mortars allows compensation for the inconsistencies in the block, the usual cement lime mortars leave much to be desired insofar as they function as bonding agents. In addition, their bonding characteristics may be seriously affected by poor workmanship in compounding the mortar and/or erecting the wall.

These conventional type walls and partitions take a great deal of time to construct inasmuch as a mason must trowel a predetermined layer of mortar on the block beds and in the head joints between adjacent blocks in each course. Blocks, say, 8" x 8" x 16" are conveniently laid with the longer dimension horizontal so that there must be a bed of mortar applied every eight inches of wall or partition height. As such, the construction of such walls or partitions is primarily dependent upon the skill of the mason.

In addition, the usual cement lime mortar utilized provides a rather weak link between the blocks due to the fact that it possesses a tensile strength on the order of only 30–50 p.s.i., as compared to a block tensile strength of over 200 p.s.i. and usually on the order of 400 p.s.i., for quality block. For these reasons the cement block wall or partition has been limited in application as when compared to a monolithic structure, such as poured concrete, and the like.

In an effort to enhance the physical properties of walls and partitions made from block, the industry has resorted to the use of steel reinforcing rods or bars having substantially the same coefficient of expansion as the block to meet specific design requirements. Reinforcement of this type is not very efficient and it functions only after blocks have cracked. As such, reinforcing rods are used primarily as a tie material but the increased cost may not justify their use. These deficiencies and limitations in masonry block walls have been long recognized, but no suitable solution has been proposed.

Recently the industry has investigated the use of special adhesives with a view toward strengthening the block bonding agent. Many adhesives have been employed, but due to their properties or their cost, their use has been minimal. In addition, where they have been employed, it has been found necessary to utilize concrete and cinder blocks whose pallet or non-factory surfaces have been pre-ground to a planar condition. While this is effective in facilitating the erection of an acceptable wall, the cost is almost prohibitive.

The aforementioned limitations and deficiencies of masonry block walls or partitions and the method of fabricating or constructing same have been accepted and tolerated by those skilled in the art for lack of an acceptable alternative.

Accordingly, the present invention provides a new and improved masonry block wall construction and a method of fabricating same, which eliminates the necessity of head joints while reducing the number of courses of block required to construct a wall of a predetermined size or dimension. This is primarily accomplished by allowing each course of block to be laid with the longer dimension arranged vertically, while at the same time employing improved bonding agents. The method of constructing a wall or partition utilizing the present invention provides a substantial savings in labor with an attendant reduction in cost, and results in a substantially monolithic structure with enhanced physical characteristics and properties. As such, the strength of block walls is increased to a point where it is more competitive with poured concrete walls and partitions. In addition, a wall or partition constructed according to the instant invention provides longitudinal passages which may be conveniently and advantageously utilized for plumbing, wiring, etc., as the case may be.

In view of the foregoing, an object of this invention is to provide a new and improved method of constructing a wall or partition of masonry block.

Another object of this invention is to provide a new and improved wall or partition of masonry block.

Another object of this invention is to provide a new and improved method of constructing a wall of masonry block which eliminates the use of cement lime mortar and which eliminates one course of bonding material for each course of block.

A further object of this invention is to provide a new and improved wall structure and method of making same which eliminates the requirement of a bonding agent in the head joints, the use of pre-ground block and the need for employing highly skilled labor.

A still further object of this invention is to provide a new and improved method of constructing a wall of masonry block which may be readily practiced by a person having little if any previous experience in laying masonry block.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which the single figure is a perspective view, partially cut away, of a wall or partition structure in accordance with the invention.

Referring now to the drawing, a wall 10 constructed in accordance with the invention comprises a plurality of courses 11 of concrete blocks. Each of the blocks 12 has opposed facing surfaces 13, side surfaces 14, one of which is a pallet surface, and end surfaces which provide an adhesive bed surface or surfaces 15. The blocks 12 are generally prismatic shaped and the particular blocks illustrated are of hollow or cored construction. They are formed with a tongue 16 and groove 17, which facilitates alignment during the laying thereof. While cored blocks have been chosen for purposes of illustration, it should be understood that the invention contemplates the use of solid blocks and blocks having different end surface configurations, such as hollow bed surfaced block, plain square end block, and the like.

The blocks forming the walls 10 are set on a suitable foundation, here exemplified by a footer 18. In constructing the wall 10, an adhesive mortar 19 is preferably laid in beads 20 and 21, upon the footer 18 or other (foundation) member along a length thereof and are so positioned as to be beneath the bottom end (bed) surfaces of the blocks 12 as the first course thereof is laid. While it is preferred that the adhesive mortar 19 be laid in beads, it is to be understood that such adhesive may be applied with brushes, knives, rollers or in separate and discrete globs, as the case may be. It is preferred that the adhesive be applied in minimal quantities so that no excess appears on the wall surface of the block or in the joints between the block. This is especially significant when a finished coating is to be applied to the block upon completion of the wall or partition. The advantage to be gained in this connection is that the coatings will not dry in a silhouetting fashion because of the difference in absorption rates of the block and the adhesive. The blocks are laid vertically with the greater dimension of the facing surfaces upright, and with the sides thereof in abutting relation. No bonding agent is placed between the side surfaces (head joints) of the blocks and the blocks are so positioned one upon the other without concern for the inconsistencies in the pallet surface thereof. Subsequently, beads 20 and 21 of the adhesive mortar are laid along the top bed surfaces of the first course of blocks and the second course of blocks are laid thereon with the longer dimension of the facing surfaces vertical but in offset or staggered relation to the blocks of the preceding course. Each block of the second course spans a joint of the blocks of the first course and each succeeding course of blocks is laid in staggered relation upon the preceding course in the same manner. After the wall or partition has been constructed a finished coating 22 of plaster, stucco, or the like material, may be applied to one or both sides of the wall to provide a finished appearance.

When proceeding according to the invention, the chosen adhesive or bonding agent should be one which develops a bond strength to the block which is substantially equal to the tensil strength of the block or higher. In addition, it is preferred that the adhesive be fireproof in order to comply with building regulations. An adhesive according to a preferred embodiment of the invention which meets both of these requirements is described in the U.S. patent application of William F. Beckworth, Ser. No. 152,055, filed Nov. 13, 1961, now Patent No. 3,240,736, the disclosure of which is incorporated herein by reference. Such an adhesive is available from the Dow Chemical Company and is identified and marketed under the trademark "Threadline."

In addition to the "Threadline" marketed adhesives, other adhesives, which meet the requirements according to the instant invention, are various epoxy, polyester, thermoplastic and polyurethane resins, which are formulated with portland cement, latex and activators such as the polyamides and the like. These adhesives are marketed under various trademarks such as, for example, (1) Sarabond (a saran latex adhesive) by Dow Chemical Company, (2) Hydrepoxy by Concrete Masonry Research, Inc., of Milford, Connecticut, (3) Laticrete (a styrene-butadiene latex adhesive) by U.S. Rubber, (4) Daraweld by Dewey-Almy Chemical Company and (5) Sonocrete by the Sonneborn Co.

The resulting wall or partition constructed according to the specifications and description noted above provides an essentially monolithic wall having no vertical bonding between the blocks thereof, except as may sometimes be desired at the vertical end surfaces of the wall because of the staggering of the blocks of each course. As such, walls constructed in accordance with the invention may be used as bearing or non-bearing walls, either exterior or interior, as well as foundation walls and fence walls.

It may be seen that the invention effectively eliminates one course of blocks for every two courses as compared with the conventional lime mortar bound block walls. Moreover, the invention eliminates the requirement for a bonding agent in the head joints of the blocks and therefore substantially reduces the time required to construct a wall of concrete block. For example, tests have shown that a 4' x 8' section of wall may be constructed using the method disclosed herein in approximately nine minutes.

An additional advantage of this wall construction using cored blocks, as illustrated, is that the core apertures define longitudinal conduits 23 adapted to receive plumbing, electrical conduits, telephone wiring and the like, and obviates the necessity of exterior duct work.

In addition, by eliminating or knocking out a portion of the block webs 24, it is possible to define vertical conduits also adapted to receive plumbing, electrical conduits, telephone wiring, and the like, thus obviating the necessity of employing exterior duct work, etc.

It is also to be understood that the following claims are intended to cover all of the generic and specific features of the invention herein described, and all statements of the scope of the invention which, as a matter of language, might be said to fall therebetween.

What is claimed is:

1. A wall comprising a supporting base having adhesive thereon a plurality of concrete blocks of generally prismatic outline having opposed generally rectangular side, end and facing surfaces, said blocks being laid in courses with the larger dimension of said facing surfaces vertical and the end faces being horizontal, the blocks in the lowermost course being supported on and bonded to said supporting base the blocks of each of the other causes being staggered with respect to the blocks of the next lower course so that the lower end surface of each of said blocks in said other courses spans a portion of the end surfaces of the blocks directly below, each of said blocks being bonded to the spanned blocks therebelow at said end surfaces by adhesive beads extending longitudinally across said end surfaces, the blocks in each of said other courses having their side surfaces in adjacent vertical relation and being free from said adhesive, said adhesive having a cured tensile strength at least equal to that of said blocks.

2. The wall of claim 1 wherein said blocks are cored through their smaller dimension and define horizontal conduits along the length of the courses.

3. The wall of claim 1 wherein said beads are disposed along generally parallel spaced apart lines.

4. The wall of claim 2 further including a finish coating applied to at least one side of said wall.

5. The wall of claim 1 wherein the blocks of each course are in abutting vertical relation.

6. The wall of claim 1 wherein adjacent ends of the blocks in said other courses are tongue and grooved, with the ends of each block having parallel spaced apart surfaces providing adhesive beds for said beads along each course.

References Cited

UNITED STATES PATENTS

| 1,203,934 | 11/1916 | Straight | 52—606 X |
| 1,242,087 | 10/1917 | Waddell | 52—595 |
| 1,437,077 | 11/1922 | Rutzler | 52—595 |
| 1,727,363 | 9/1929 | Bone | 52—220 X |

FOREIGN PATENTS 545,350   3/1956   Belgium.

HENRY C. SUTHERLAND, *Primary Examiner.*

C. G. MUELLER, *Assistant Examiner.*

U.S. Cl. X.R.

52—436, 503, 593, 606